(12) United States Patent
Ryoo et al.

(10) Patent No.: US 11,109,274 B2
(45) Date of Patent: *Aug. 31, 2021

(54) METHOD AND APPARATUS FOR TRANSMITTING OR RECEIVING PAGING IN WIRELESS COMMUNICATION SYSTEM

(71) Applicant: Samsung Electronics Co., Ltd., Suwon-si (KR)

(72) Inventors: Sun-Heui Ryoo, Yongin-si (KR); Jung-Soo Jung, Seongnam-si (KR); Ra-Yeon Ahn, Seoul (KR); Ji-Won Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,764

(22) Filed: May 18, 2020

(65) Prior Publication Data

US 2020/0288348 A1 Sep. 10, 2020

Related U.S. Application Data

(63) Continuation of application No. 15/754,109, filed as application No. PCT/KR2016/008862 on Aug. 11, 2016, now Pat. No. 10,659,993.

(Continued)

(51) Int. Cl.
*H04L 5/00* (2006.01)
*H04W 28/08* (2009.01)
(Continued)

(52) U.S. Cl.
CPC .......... *H04W 28/08* (2013.01); *H04J 11/00* (2013.01); *H04L 1/0007* (2013.01); *H04L 5/00* (2013.01);
(Continued)

(58) Field of Classification Search
CPC .............. H04L 29/06476; H04L 69/22; H04L 29/0653; H04L 5/0055; H04L 5/0057;
(Continued)

(56) References Cited

U.S. PATENT DOCUMENTS

2008/0268878 A1 10/2008 Wang et al.
2009/0176515 A1* 7/2009 Willey ................ H04W 68/025
455/458

(Continued)

FOREIGN PATENT DOCUMENTS

CN 101652958 A 2/2010
CN 102118222 A 7/2011
(Continued)

OTHER PUBLICATIONS

Chinese Office Action dated Apr. 2, 2020, issued in Chinese Application No. 201680048160.0.
(Continued)

*Primary Examiner* — Dai Phuong
(74) *Attorney, Agent, or Firm* — Jefferson IP Law, LLP

(57) ABSTRACT

The present invention relates to a method and apparatus for effectively transmitting or receiving paging in a wireless communication system supporting a plurality of services. A method for transmitting paging by a base station in a wireless communication system supporting a plurality of services according to an embodiment of the present disclosure comprises the steps of: transmitting information on a paging slice corresponding to a service in which paging is transmitted to a terminal; and transmitting the paging to the terminal through the paging slice.

16 Claims, 10 Drawing Sheets

Related U.S. Application Data

(60) Provisional application No. 62/208,198, filed on Aug. 21, 2015.

(51) Int. Cl.
| | | |
|---|---|---|
| *H04J 11/00* | (2006.01) | |
| *H04W 48/16* | (2009.01) | |
| *H04W 48/14* | (2009.01) | |
| *H04L 1/00* | (2006.01) | |
| *H04L 12/805* | (2013.01) | |
| *H04W 72/12* | (2009.01) | |
| *H04W 68/02* | (2009.01) | |

(52) U.S. Cl.
CPC .......... *H04L 5/0055* (2013.01); *H04L 5/0057* (2013.01); *H04L 47/365* (2013.01); *H04W 48/14* (2013.01); *H04W 48/16* (2013.01); *H04W 68/02* (2013.01); *H04W 72/1263* (2013.01)

(58) Field of Classification Search
CPC ............ H04L 47/365; H04N 21/64322; H04N 21/242; H04N 21/236; H04J 1/0007; H04W 80/04; H04W 28/08; H04W 48/14; H04W 48/16; H04W 68/02; H04W 72/1263
See application file for complete search history.

(56) References Cited

U.S. PATENT DOCUMENTS

| | | |
|---|---|---|
| 2009/0221284 A1 | 9/2009 | Kim et al. |
| 2010/0120444 A1 | 5/2010 | Kuningas et al. |
| 2010/0157901 A1 | 6/2010 | Sanderovitz et al. |
| 2010/0202400 A1 | 8/2010 | Richardson et al. |
| 2011/0053616 A1 | 3/2011 | Lee et al. |
| 2011/0053617 A1 | 3/2011 | Lee et al. |
| 2011/0159904 A1 | 6/2011 | Cho |
| 2012/0122495 A1 | 5/2012 | Weng et al. |
| 2013/0022090 A1* | 1/2013 | Weng ................ H04L 25/03343 375/219 |
| 2013/0028117 A1 | 1/2013 | Montojo et al. |
| 2014/0056220 A1 | 2/2014 | Poitau et al. |
| 2014/0071953 A1 | 3/2014 | Tian et al. |
| 2014/0342747 A1 | 11/2014 | Lee et al. |
| 2015/0063095 A1 | 3/2015 | Deng et al. |
| 2015/0173045 A1 | 6/2015 | Lee et al. |
| 2015/0215082 A1 | 7/2015 | Agiwal et al. |
| 2015/0223169 A1 | 8/2015 | Ghosh |
| 2015/0327215 A1 | 11/2015 | Xu |
| 2016/0044634 A1 | 2/2016 | Seo et al. |
| 2016/0057731 A1* | 2/2016 | Damnjanovic ... H04W 72/0453 455/458 |
| 2016/0112490 A1* | 4/2016 | Son ................ H04N 21/234309 709/219 |
| 2016/0119963 A1 | 4/2016 | Casati |
| 2016/0174188 A1 | 6/2016 | Kim et al. |
| 2016/0198507 A1 | 7/2016 | Wu et al. |
| 2016/0255527 A1 | 9/2016 | Yang et al. |
| 2017/0013443 A1 | 1/2017 | Gopalakrishnan et al. |
| 2018/0049182 A1* | 2/2018 | Luo ..................... H04W 72/048 |
| 2018/0192426 A1 | 7/2018 | Ryoo et al. |
| 2018/0262980 A1 | 9/2018 | Jeong et al. |

FOREIGN PATENT DOCUMENTS

| | | |
|---|---|---|
| KR | 10-2007-0095680 A | 10/2007 |
| KR | 10-2011-0021174 A | 3/2011 |
| KR | 10-2011-0021648 A | 3/2011 |
| KR | 10-2014-0118496 A | 10/2014 |
| WO | 2014/152853 A2 | 9/2014 |
| WO | 2014/163335 A1 | 10/2014 |
| WO | 2014/187527 A1 | 11/2014 |
| WO | 2015/016546 A1 | 2/2015 |
| WO | 2015018239 A1 | 2/2015 |

OTHER PUBLICATIONS

Extended European Search Report dated Jul. 26, 2018, issued in European Application No. 16839536.6-1220.
International Search Report dated Nov. 15, 2016, issued in International Application No. PCT/KR2016/009212.
U.S. Non-Final Office Action dated Nov. 18, 2019, issued in U.S. Appl. No. 15/754,140.
U.S. Notice of Allowance dated May 26, 2020, issued in U.S. Appl. No. 15/754,140.

* cited by examiner

METHOD AND APPARATUS FOR TRANSMITTING OR RECEIVING PAGING IN WIRELESS COMMUNICATION SYSTEM

CROSS-REFERENCE TO RELATED APPLICATION(S)

This application is a continuation application of prior application Ser. No. 15/754,109, filed on Feb. 21, 2018, which has issued as U.S. Pat. No. 10,659,993 on May 19, 2020, and is a U.S. National Stage application under 35 U.S.C. § 371 of an International application number PCT/KR2016/008862, filed on Aug. 11, 2016, which was based on and claimed priority under 35 U.S.C § 119(e) of a U.S. Provisional application Ser. No. 62/208,198, filed on Aug. 21, 2015, in the U.S. Patent and Trademark Office, the disclosure of which is incorporated by reference herein in its entirety.

TECHNICAL FIELD

The present invention generally relates to a method and apparatus for transmitting and receiving paging in a wireless communication system, and more particularly, to a method and apparatus for transmitting and receiving paging in a wireless communication system that supports a plurality of services.

BACKGROUND ART

In order to meet wireless data traffic demand, which has increased since the commercialization of a 4th Generation (4G) communication system, efforts to develop an improved 5G communication system or a pre-5G communication system have been made. For this reason, the 5G communication system or the pre-5G communication system is referred to as a beyond 4G network communication system or a post LTE system.

In order to achieve a high data transmission rate, the implementation of the 5G communication system in a super-high frequency (mmWave) band (e.g., 60 GHz band) is being considered. In the 5G communication system, technologies such as beamforming, massive MIMO, Full Dimensional MIMO (FD-MIMO), an array antenna, analog beam-forming, and a large scale antenna have been discussed to mitigate propagation path loss in the super-high frequency band and to increase a propagation transmission distance.

Further, technologies such as an evolved small cell, an advanced small cell, a cloud radio access network (cloud RAN), an ultra-dense network, device to device communication (D2D), a wireless backhaul, a moving network, cooperative communication, coordinated multi-points (CoMP), and interference cancellation have been developed to improve the system network in the 5G communication system.

In addition, in the 5G system, there have been developed advanced coding modulation (ACM) schemes such as hybrid FSK and QAM modulation (FQAM) and sliding window superposition coding (SWSC), and advanced access technologies such as filter bank multi carrier (FBMC), non orthogonal multiple access (NOMA), and sparse code multiple access (SCMA).

Meanwhile, the Internet has been evolved to an Internet of Things (IoT) network in which distributed components such as objects exchange and process information from a human-oriented connection network in which humans generate and consume information. An Internet of Everything (IoE) technology may be an example in which a big data processing technology through a connection with a cloud server or the like is combined with the IoT technology.

In order to implement IoT, technical factors such as a sensing technique, wired/wireless communication, network infrastructure, service interface technology, and security technology are required, and technologies such as a sensor network, Machine to Machine (M2M) communication, Machine Type Communication (MTC), and the like for a connection between objects are recently being researched.

In an IoT environment, an intelligent Internet Technology (IT) service that collects and analyzes data generated from connected objects, and creates a new value for peoples' lives may be provided. IoT may be applied to fields, such as smart home, smart building, smart city, smart car, connected car, smart grid, health care, smart home appliance, or high-tech medical services, through the convergence of the conventional IT and various industries.

Research on communication technologies for a next generation communication system such as the 5G communication system has been conducted, and one of the examples of the communication technologies is a technology for supporting a plurality of Quality of Services (QoS) in a wireless communication system that supports a plurality of services. As a New Radio (NR) study item that is discussed by 3rd Generation Partnership Project (3GPP) as an example of a communication system that supports the plurality of QoSs, a communication system is being designed, in which a physical layer frame (PHY frame) structure for satisfying QoS which is different for each service (or slice) and a sub-carrier spacing are optimized for each service. In the communication system, an independent paging signal is transmitted for each service. In this instance, a UE that supports a plurality of services needs to independently receive a paging signal transmitted for each service. When the UE is in an idle state, the amount of power consumed by the UE may increase.

DETAILED DESCRIPTION OF THE INVENTION

Technical Problem

According to aspects of the present invention, a method and apparatus for efficiently transmitting and receiving paging in a wireless communication system that supports a plurality of services, and a communication method and apparatus using the same are provided.

According to aspects of the present invention, a method and apparatus for transmitting and receiving paging, which reduce the amount of power consumed in a wireless communication system that supports a plurality of services are provided.

According to aspects of the present invention, a method and apparatus for transmitting and receiving cross-slice paging in a wireless communication system that supports a plurality of services are provided.

According to aspects of the present invention, a method and apparatus for an efficient RACH procedure in a wireless communication system that supports a plurality of services are provided.

According to aspects of the present invention, a method and apparatus for operating a paging period for each service in a wireless communication system that supports a plurality of services are provided.

According to aspects of the present invention, a method and apparatus for setting a PF/PO for paging in a wireless communication system that supports a plurality of services are provided.

Technical Solution

According to embodiments of the present invention, a method for transmitting paging by a base station in a wireless communication system supporting a plurality of services includes: transmitting, to a user equipment (UE), information on a paging slice corresponding to a service in which paging is transmitted; and transmitting the paging to the UE through the paging slice.

According to embodiments of the present invention, a base station in a wireless communication system supporting a plurality of services includes: a communication interface for communicating with other network entity; and a controller for controlling transmitting, to a UE, information on a paging slice corresponding to a service in which paging is transmitted, and transmitting the paging to the UE through the paging slice.

According to embodiments of the present invention, a method for receiving paging by a user equipment (UE) in a wireless communication system supporting a plurality of services includes: receiving, from a base station, information on a paging slice corresponding to a service in which paging is transmitted; and receiving the paging through the paging slice.

According to embodiments of the present invention, a UE in a wireless communication system supporting a plurality of services include: a communication interface for communicating with other network entity; and a controller for controlling receiving, from a base station, information on a paging slice corresponding to a service in which paging is transmitted, and receiving the paging through the paging slice.

According to embodiments of the present invention, a rule for determining the paging slice may include at least one of (1) selecting a slice minimizing delay, (2) selecting a high-capacity slice, (3) selecting a low-power slice, (4) selecting a slice with low paging loading in a Tracking Area Unit (TAU) area, and (5) selecting a slice that secures a larger amount of resources (to which a larger amount of resources is allocated) in a corresponding TAU area, according to a key performance priority.

According to embodiments of the present invention, a deferring/supplementary (deferring) operation which may be performed when a paging reception error occurs may include at least one of: (1) an operation of transitioning to a sleep state without UE's paging reception, (2) an operation of extending a time window (PF/PO: Paging Frame/Paging Occasion) for receiving paging, and (3) a paging slice extending operation, that is, an operation of receiving paging through a candidate slice, excluding a paging resource designated as a paging slice. The options for the deterring/supplementary (deferring) operation, the size of a time window for receiving paging, and information on a candidate slice may be determined by an MME. In the setting operation, the MME may determine a paging deferring option and related parameters in consideration of mobility of a UE among base stations as idle mobility. A base station may receive setting information from the MME, and may signal the same to a UE when configuring or releasing RRC for the UE.

According to embodiments of the present invention, a message for transferring the paging may include at least one of a slice identifier, RACH related information, and information on an activated slice, together with a UE identifier, and the RACH related information includes RACH option information for performing RACH using one of an RACH resource of the paging slice, an RACH resource for each slice, a common RACH resource, and an earliest RACH resource.

According to embodiments of the present invention, by adding, as a new field, information for distinguishing whether the corresponding RACH is MO/MT, and slice information of downlink data that arrives at a connection request corresponding to Message 3 in the earliest RACH procedure, RRC (re)configuration (Message 4) is immediately performed with respect to the corresponding service even when cross-slice RACH is performed.

According to embodiments of the present invention, the operation of transitioning to an RRC_connected state by a UE after performing the RACH procedure may include at least one of: an operation of activating all of the slices of the UE; an operation of activating some of the slices of the UE, and particularly, activating a slice corresponding to a service of traffic indicated by paging that arrives at the UE; and an operation of activating some of the slices of the UE, and particularly, activating a paging slice, irrespective of a service of traffic indicated by paging that arrives at the UE.

According to embodiments of the present invention, a new PF and a new PO are set for receiving paging for each service (slice), and a paging period Tc is separately operated for each service (in consideration of QoS delay), and Tc is operated using a multiple (e.g., an integer multiple), whereby Tx/Rx duration may be minimized.

According to embodiments of the present invention, UEs that receive paging of the same service are grouped, and the UEs operate as the same paging indicator group.

MODE FOR CARRYING OUT THE INVENTION

Figure 1:
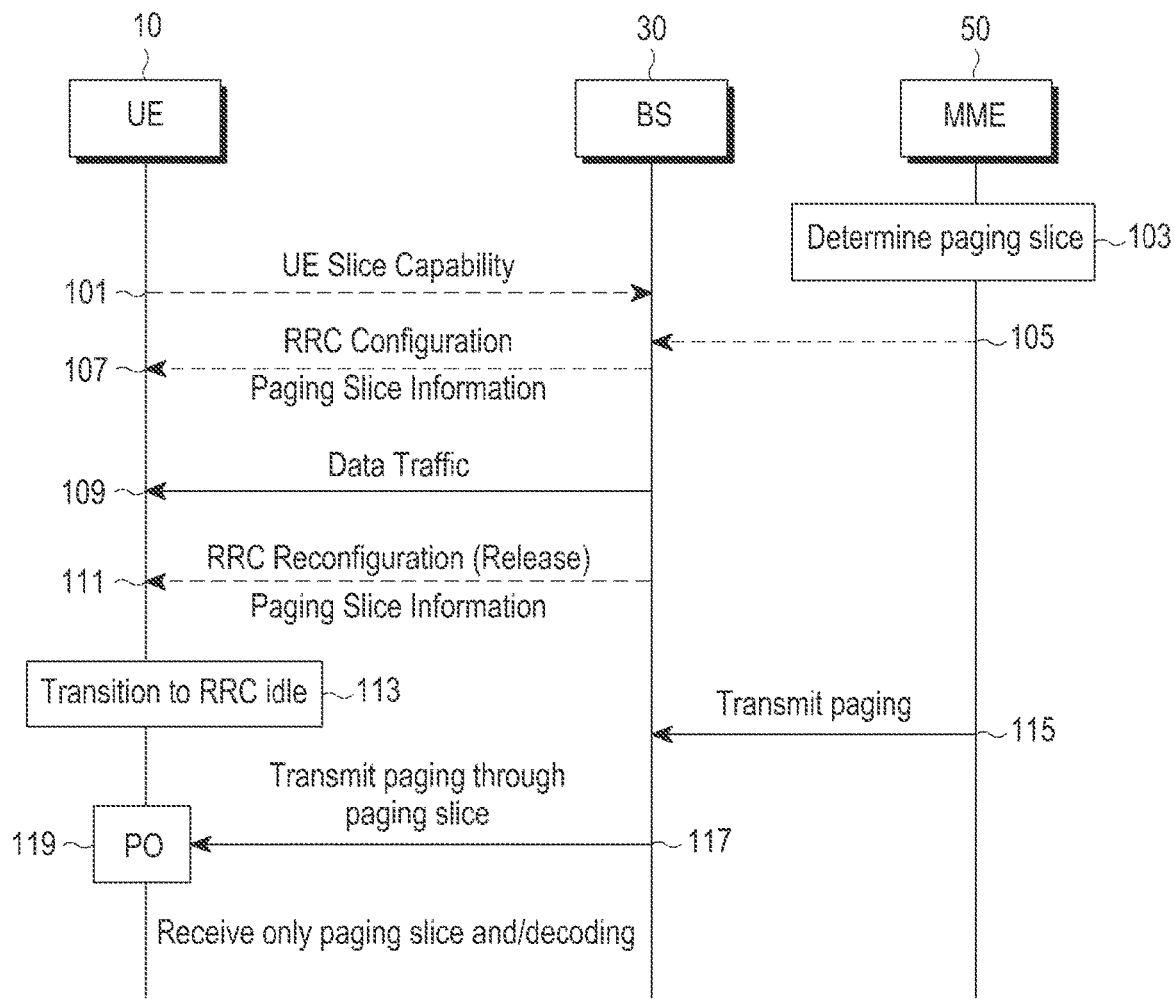
FIG. 1 is a diagram illustrating an operation of setting cross-slice paging in a wireless communication system that supports a plurality of services according to embodiments of the present invention.

In the following description of embodiments of the present invention, a detailed description of known functions or configurations incorporated herein will be omitted when it is determined that the detailed description thereof may unnecessarily obscure the subject matter of the present invention.

Hereinafter, various embodiments of the present invention will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" may modify corresponding elements regardless of the order or importance, and is used only to distinguish one element from another element, but does not limit the corresponding elements. When an element (e.g., first element) is referred to as being "(functionally or communicatively) connected," or "directly coupled" to another element (second element), the element may be connected directly to the another element or connected to the another element through yet another element (e.g., third element)

The expression "configured to" as used in various embodiments of the present invention may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

Further, in the specification, a User Equipment (UE) may have various names such as a Mobile Station (MS), a terminal, and a device, and a Base Station (BS) may have various names such as an eNB and an Access Point (AP).

Embodiments of the present invention to be described below may be applied to operations of a base station and a UE for achieving energy efficiency key performance indicators (KPI), which is being discussed in 3GPP radio access network (RAN) 5G Study Item (SI). A technology that is being discussed in 3GPP RAN 5G SI of 3GPP is related to an energy efficiency operation which can dramatically increase power efficiency of a UE and base station network. Also, research on a technology of reducing the amount of time expended for a measurement operation and an active operation of a corresponding cell is being conducted in order to overcome the probability of additional power consumption according to a beamforming transmission scheme which is required for a millimeter wave (mmW) operation in a high-frequency band. Also, technologies provided in embodiments of the present invention are related to a method of efficiently configuring a paging operation so as to improve power efficiency of a UE and/or base station when a plurality of services are supported in a New RAT (NR)-based wireless communication system.

Hereinafter, terms used in the present specification will be briefly defined. "Paging" indicates a paging signal transmitted or received in a wireless communication system, a paging message transmitted through a paging operation, or a paging operation thereof "Slice" indicates a service provided in the wireless communication system. In the present specification, a slice and a service may be used interchangeably for ease of description, and they are understood as having the same or similar meanings. An example of the service, a New RAT-based service which is being discussed in 3GPP RAN5G SI of 3GPP may include an enhanced mobile service (eMMB), massive Machine Type Communication (mMTC), Ultra Reliable and Low Latency Communications (URLLC), or the like. The eMMB is an improved mobile broadband service, and may be a service that requires a massive capacity data transmission, such as Ultra High Definition (UHD) service, a hologram image service, a virtual reality service, or the like. The mMTC may be a communication service among massive devices (i.e., a plurality of UEs), such as a massive Internet of Things (IoT) service, or the like. The URLLC may be a service that requires ultra-high reliability and low latency communication, such as factory automation, a remote operation, an autonomous driving vehicle, or the like. A service to which the embodiments of the present invention may be applied may not be limited to eMMB, mMTC, and URLLC, and may include various services that require different QoSs. The various services may be provided, for example, in the same system which is based on 5G. "Paging slice" indicates a slice (i.e., service) that transmits paging. "Cross-slice" indicates one slice (or a plurality of slices) selected for transmitting paging from among a plurality of slices which are capable of providing a service to a UE. "Cross-slice paging" indicates paging transmitted through a cross-slice.

An example of different QoS required for each service, New RAT-based eMMB, mMTC, and URLLC, is listed in Table 1 provided below.

TABLE 1

|  | eMBB | mMTC | URLLC |
|---|---|---|---|
| Data Rate | Very high (e.g. peak rate 10 Gbps) | Not much considered | Not much considered |
| Latency | Low | Not much considered | Very Low (e.g. 1 ms end-to-end) |
| Mobility | 0 km/h to 500 km/h | Not much considered | Not much considered |

TABLE 1-continued

| | eMBB | mMTC | URLLC |
|---|---|---|---|
| Reliability | Not much considered | Not much considered | Very High (e.g. Packet loss rate: as low as 1e-04) |
| Power Consumption | Not much considered | Very Low | Not much considered |
| Connection Density | High (e.g. 200-2500 UEs/km$^2$) | Very High (e.g. 1M connections/km$^2$) | High (e.g. 10k sensor/10 km$^2$) |

Also, as shown in Table 1, QoS characteristics of each service, which may be supported by the same system, are different for each service and thus, the transmission characteristics of each service may be designed to be different for each service. For example, transmission characteristics, such as a frequency band (High/Low frequency) for each service, a frequency width (Wide/Narrow bandwidth), a transmission period (PHY Numerology (Subframe length, carrier spacing)), or the like may be designed to be different according to the characteristics of QoS of each service. A UE capable of supporting a plurality of services (slices) in the same system that supports a plurality of services is referred to as a UE having multi-slice capability (hereinafter, referred to as a multi-slice capable UE or a UE). When the multi-slice capable UE independently receives paging which is independently transmitted for each service, the amount of power consumed by the multi-slice capable UE which is in an idle state may dramatically increase.

Therefore, embodiments of the present invention propose a method of enabling an idle-state UE to perform operation even though the UE receives paging for a single slice, instead of receiving paging for each slice, in order to reduce the burden of receiving paging for each service. As the single slice, a low-power slice or a low-latency slice may be used.

The embodiments of the present invention design a paging reception operation, which is an idle-state operation performed by a multi-slice capable UE in a wireless communication system that supports a plurality of services, as cross-slice based paging reception instead of reception for each slice, whereby UE power efficiency is improved and data transmission delay is kept to a minimum. Conditions related to the paging operation of the present invention are, for example, as follows.

Condition 1) when a cross-slice paging operation is performed by crossing paging for multiple slices over one or a plurality of slices, the procedure and time for transmission and reception need to kept to a minimum and the transmission of paging information for all UEs in a cell needs to be performed without delay.

Condition 2) the amount of power consumption calculated even taking into consideration an additional operation of a UE during a paging operation in order to minimize the procedure and time for transmission and reception of the improved cross-slice paging needs to have higher power efficiency than a conventional method The operation for the cross-slice paging which has been proposed in the embodiments of the present invention may be performed through the following four steps.

Step 1: set a paging slice for each UE

Step 2: receive system information (SI) for receiving cross-slice paging, and receive a paging message designed based on cross-slice paging Step 3: operate as slice-based RACH or early RACH in an RACH operation for transitioning from an RRC_idle state to an RRC_connected state after a UE receives paging (here, the description of the slice-based RACH and early RACH will be described later.)

Step 4: activate the entirety or a part of UE's slice resources at the transition to RRC_connected state Through the step 1 to step 4, the paging reception operation by the idle-state UE in a New RAT communication system that supports a plurality of services is performed as a cross-slice based paging reception operation, instead of a paging reception operation for each slice, whereby UE power efficiency may be expected to be improved.

According to embodiments of the present invention, improvement of UE power efficiency may reduce the number of radio resources of a target that receives paging (or frequency and on duration time in a DRX operation of a UE) by performing a cross-slice paging reception operation, instead of performing a multi-slice paging reception operation that independently receives paging for multiple slices. Also, in the case of single slice paging reception, a paging operation is performed through a low-power slice instead of a high-power slice, whereby an idle-state UE may reduce the amount of power consumed for performing a paging operation with respect to one slice. Also, a delay occurring when the state of a UE is changed from an RRC_idle state into an RRC_connected state may be reduced by utilizing RACH resources allocated for each slice through cross-slice, whereby UE power efficiency may be improved and delay performance may be also improved.

According to embodiments of the present invention, an example of the configuration of step 1 to step 4 for cross-slice paging will be described as follows.

Step 1: based on a UE's capability feedback reflecting a slice supportable for each UE and energy efficiency information of a corresponding slice, a network entity (e.g., Mobility Management Entity (MME)) that manages the UE's mobility may determine a paging slice. As another example, the MME may determine a paging slice based on the UE's subscription information, instead of the UE's feedback information. The subscription information may be provided from, for example, a Home Subscriber Server (HSS). The base station may receive information on a paging slice determined by the MME, and may indicate the corresponding paging slice to a UE. The base station may provide information for setting the paging slice to the UE through control signaling.

Step 2: for paging reception, system information (SI) includes common SI broadcasted such that all UEs can receive the same, and slice-dedicated SI which corresponds to a slice required for cross-slice paging. The common SI may include at least one of information on a common slice and indication information on the slice-dedicated SI. The slice-dedicated SI may be set for each slice (service). A UE receives system information (SI) for receiving paging, and receives a paging message designed based on cross-slice paging. New fields may be included in the paging message together with a UE ID, in order for a paging reception operation in a paging slice. The new fields may include at least one of fields associated with, for example, a slice indicator, an RACH, and an activation slice option. The detailed description of the new fields will be described later. Also, in embodiments of the present invention, examples of deferring/supplementary (deferring) operations that may be performed when an error occurs in the paging reception by a UE are (1) to (3) as provided below.

(1) an operation of immediately transitioning to a sleep state without the UE's paging reception (2) an operation of extending a time window (PF/PO: Paging Frame/Paging Occasion) for receiving paging (3) a paging slice extending operation, that is, an operation of receiving paging through a candidate slice which is different from a paging resource designated as a paging slice Options for the deferring operation that is performed when a paging reception error occurs, and the size of a time window for paging reception, information on a candidate slice, or the like may be set by the MME. In the setting operation, the MME may determine and set a paging deferring option and related parameters in consideration of mobility of a UE among base stations as idle mobility. A base station may receive setting information from the MME, and may provide the setting information to a UE when RRC is configured or released for the UE.

Step 3: when it is determined that traffic arrives at a corresponding UE when paging is received, examples of available options for an RACH operation of the UE are (1) to (4) as provided below.

(1) common slice RACH: an operation of transitioning an RRC_Idle state to an RRC_connected state using common RACH resources which are independent from a slice (2) slice-dedicated RACH: an operation of transitioning an RRC_Idle state to an RRC_connected state using RACH resources for each slice based on a service of paged traffic, wherein, in the case of the slice-dedicated RACH, a UE needs to be aware of RACH settings of all slices, in advance, and thus, may need to receive SI for each of all the services, which may be burdensome.

(3) Cross-Slice RACH (performing RACH using a paging slice): an operation of transitioning an RRC_Idle state to an RRC_connected state using an RACH resource of a paging slice, irrespective of a service of traffic indicated by paging that arrives at a UE, wherein the paging slice is determined in advance, and thus, the UE may know the corresponding paging slice before receiving paging. Therefore, the UE needs to receive only SI for each service of the corresponding paging slice, whereby the UE may reduce the burden of receiving SI.

(4) Cross-Slice RACH (performing RACH using an early slice): an operation of transitioning an RRC_idle state to an RRC_connected state using an RACH resource of a paging slice, irrespective of a service of traffic indicated by paging that arrives at a UE, wherein the UE needs to know RACH settings of all slices since the UE utilizes the earliest RACH resource, which is the closest to an arbitrary point. Therefore, the UE has the burden of receiving SI for each service, but the UE utilizes the earliest RACH resource which is the closest to an arbitrary point, whereby the delay of an operation of transitioning an RRC_idle state to an RRC_connected state may be reduced and the user delay QoS may be improved. Also, when the cross-slice RACH operation is performed, in an RRC configuration transitioned from an RRC_idle state to an RRC_connected state, a UE needs to report service information of corresponding traffic to a base station. Accordingly, by adding information for distinguishing whether the corresponding RACH is Mobility Originated (MO)/Mobility Terminated (MT) and slice (service) information to a new field(s) of a connection request corresponding to message 3 in the existing RACH procedure, RRC (re)configuration (corresponding to message 4 in the existing RACH procedure) is immediately performed with respect to the corresponding service even when cross-slice RACH is performed, whereby data transmission delay may be avoided when a connected-state operation is performed.

Step 4: an operation of transitioning to an RRC_connected state by a UE, after an RACH procedure. In the operation in step 4, an option for activating slice resources of a UE may include at least one of: an operation of activating all of the slices of the UE; an operation of activating some of the slices of the UE, and particularly, activating a slice corresponding to a service of traffic indicated by paging that arrives at the UE; and an operation of activating some of the slices of the UE, and particularly, activating a paging slice, irrespective of a service of traffic indicated by paging that arrives at the UE.

The above described embodiments of the present invention have illustrated an operation of receiving system information for receiving paging according to a cross-slice paging setting and an operation option for power reduction of a multi-slice capable UE, an operation of performing slice RACH to an RRC_connected state, and an operation of activating a slice. According to embodiments of the present invention, services (slices) supported by a multi-slice capable UE may include a slice capable of supporting an improved QoS, such as a slice having high link capacity, a slice with low delay, or the like. A low energy consumption slice supports relatively low QoS from among services supported by a multi-slice capable UE, but consumes a small amount of power, whereby the low energy consumption slice may be advantageous from the perspective of energy efficiency.

Hereinafter, embodiments of the present invention will describe operations of step 1 to step 4 for cross-slice paging in detail.

<Step 1: Cross-Slice Paging Setting Operation>

FIG. 1 is a diagram illustrating an operation of setting cross-slice paging in a wireless communication system that supports a plurality of services according to various embodiments of the present invention. The operation of FIG. 1 includes an operation of setting a paging slice indication for a UE based on UE capability information, in order to set cross-slice paging.

Referring to FIG. 1, in operation 101, a UE 10 transmits UE slicing capability information to a base station 30. The information is based on UE capability information that takes into consideration energy efficiency for each slice. A paging slice may be set for each UE, and capability feedback (i.e., UE slicing capability information) reflecting a slice supportable for each UE and energy efficiency information of a corresponding slice may be transmitted from the UE 101 to the base station 30. An MME 50 that receives the capability feedback from the base station 30 determines a paging slice for the UE 10, and transfers information on the determined paging slice (hereinafter, paging slice information) to the base station 30 in operations 103 and 105. In operation 107, the base station 30 transmits the paging slice information to the UE 10 through control signaling for RRC configuration. In operation 109, the base station 30 transmits data traffic to the UE 10. The paging slice information may be transmitted to the UE 10 through control signaling for RRC reconfiguration or release as described in operation 111.

Subsequently, when the UE 10 is switched into an idle state in operation 113, paging transmitted to the UE 10 is transmitted in a paging slice indicated by the paging slice information in operations 115 and 117. In operation 119, the UE 10 receives paging in a paging occasion (PO) calculated for the reception of paging.

In the present embodiment, as a method of indicating a multi-slice paging option, 1) and 2) provided below may be used.

1) a slice-independent paging method, that is, a method of independently transmitting each slice paging according to a conventional operation 2) a cross-slice paging method, that is, a method of transmitting paging through one slice selected from among a plurality of slices capable of providing a service to a UE A method of indicating the paging slice information in the present embodiment is the cross-slice paging method, that is, a method of setting, for a UE, one slice selected from among a plurality of slices capable of providing a service to the UE.

Table 2 provided below is an example of priorities of slices according to a rule for selecting a paging slice. The rule for selecting a paging slice for each UE in the example of Table 2 may include at least one of (1) selecting a slice minimizing delay, (2) selecting a high-capacity slice, (3) selecting a low-power slice, (4) selecting a slice with low paging loading in a tracking area unit (TAU) area, and (5) selecting a slice that secures a larger amount of resources (a slice to which a larger amount of resources is allocated) in a corresponding TAU area, according to a key performance priority.

TABLE 2

| Option index | Paging slice selection criterion | Example of paging slice priority |
| --- | --- | --- |
| 1 | select slice minimizing delay | ① URLLC > eMBB > mMTC<br>② URLLC > mMTC > eMBB |
| 2 | select high-capacity slice | ① eMBB > mMTC > URLLC<br>② eMBB > URLLC > mMTC |
| 3 | Select low-power slice | ① mMTC > URLLC > eMBB<br>② mMTC > eMBB > URLLC |
| 4 | Select slice with low paging loading in corresponding TAU area | ① URLLC > eMBB > mMTC<br>② URLLC > mMTC > eMBB<br>③ eMBB > mMTC > URLLC<br>④ eMBB > URLLC > mMTC<br>⑤ mMTC > URLLO > eMBB<br>⑥ mMTC > eMBB > URLLC |
| 5 | select slice that secures larger amount of resources (slice to which larger amount of resources is allocated) in corresponding TAU area | ① URLLC > eMBB > mMTC<br>② URLLC > mMTC > eMBB<br>③ eMBB > mMTC > URLLC<br>④ eMBB > URLLC > mMTC<br>⑤ mMTC > URLLC > eMBB<br>⑥ mMTC > eMBB > URLLC |

A method of transmitting paging slice information to the UE 10, after the MME 50 determines a paging slice, and informs the base station 30 of the paging slice, may be based on option 1 and option 2 provided below.

Option 1) explicit indication of a paging slice: a control signaling method that explicitly indicates a paging slice for each UE Option 2) implicit paging slice rule transmission: a method of providing a UE with a rule for determining a paging slice for each UE According to the method based on the option 1, paging slice information may be transmitted through control signaling which is for controlling a predetermined UE, such as RRC (re)configuration and/or RRC release for configuration between a base station and a UE in the RRC_connected state.

In the method based on the option 2, the paging slice selection rule may be applied to a cell, a TAU, or an MME through system information such as an MIB, SIBx, or the like.

As another method of transmitting the paging slice information, a method of primarily transmitting information indicating whether paging exists for each slice through a paging indicator, and indicating paging slice information which is to be transmitted when paging is actually performed may be used.

<Step 2: Cross-Slice Paging Reception Operation>

Figure 2:
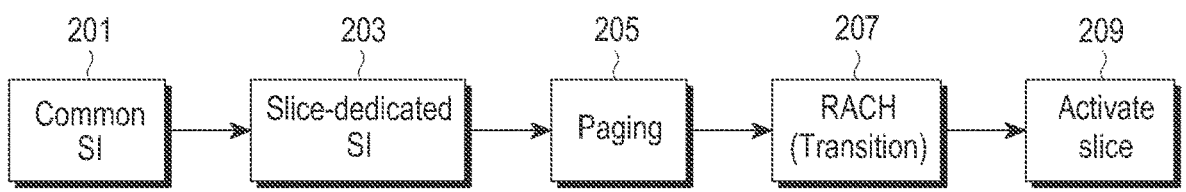
FIG. 2 is a diagram illustrating an operation of receiving cross-slice paging in a wireless communication system that supports a plurality of services according to embodiments of the present invention.

FIG. 2 is a diagram illustrating an operation of receiving cross-slice paging in a wireless communication system that supports a plurality of services according to various embodiments of the present invention.

Referring to FIG. 2, in operation 201, a UE receives common SI broadcasted such that all UEs can receive the same. The common SI may include at least one of information on a common slice and indication information on slice-dedicated SI. For example, the common SI may include the minimum information, thereby reducing the burden of transmitting a common control signal. The common SI additionally transmits indication information for slice-dedicated SI (slice dedicated SI info), for example, [Broadcast period, Radio Resource], in addition to information on a downlink included in an existing MIB, for example [Bandwidth, SFN, Scheduling Info], thereby indicating a reception resource of the slice-dedicated SI to be transmitted.

In operation 203, a UE that receives the common SI receives the slice-dedicated SI based on the indication information for the slice-dedicated SI. The slice-dedicated SI may transmit a parameter setting different for each service, and may transmit slice-dedicated paging information, for example, [Parameter, Slice Dedicated RACH resource configuration information required to calculate a Paging period and a Paging Frame/Paging occasion].

In this instance, SI that a UE needs to receive may be changed according to a cross-slice paging option. For example, all UEs need to receive the common SI. In the case of the slice-dedicated SI, a UE receives SI corresponding to a slice required for cross-slice paging. In the case of PO time window extension reception, according to an operation of receiving paging through a candidate slice, a UE may also receive SI related to a candidate slice.

In operation 205, a UE that receives the slice-dedicated SI receives a paging message in a slice corresponding to the cross-slice paging. Information included in fields of the payload of the paging message may include at least one of, for example, an existing UE ID, a slice indicator, an RACH, and information on activation of a slice, as shown in Table 3.

TABLE 3

| UE ID | Slice Indicator | RACH options | Slice Activation options |
| --- | --- | --- | --- |
| | | 1. Common RACH | 1. All Slice Activation |
| | | 2. Slice Dedicated RACH | 2. Paging Slice Partially Activation |
| | | 3. Earliest RACH | 3. Data Arrival Slice Partially Activation |

Table 4 provided below provides, for example, 8 operation states according to option values in the fields of the payload of the paging message. The operation states are possible examples of RACH and a connected state transition operation.

TABLE 4

| | Slice Indicator | RACH options | Slice (De)activation options |
|---|---|---|---|
| 1 | X | Common RACH | All Slice Activation |
| 2 | X | Common RACH | Paging Slice activation only (Slice cross scheduling) |
| 3 | X | Earliest RACH | All Slice Activation |
| 4 | X | Earliest RACH | Paging Slice activation only (Slice cross scheduling) |
| 5 | O | Slice Dedicated RACH | Data arrival slice Activation only |
| 6 | O | Slice Dedicated RACH | Paging Slice activation only (Slice cross scheduling) |
| 7 | O | Earliest RACH | Data arrival slice Activation only |
| 8 | O | Earliest RACH | Paging Slice activation only (Slice cross scheduling) |

In operation 205, at least one of the above described deferring/supplementary (deferring) operations is performed when a paging reception error occurs.

Figure 3:
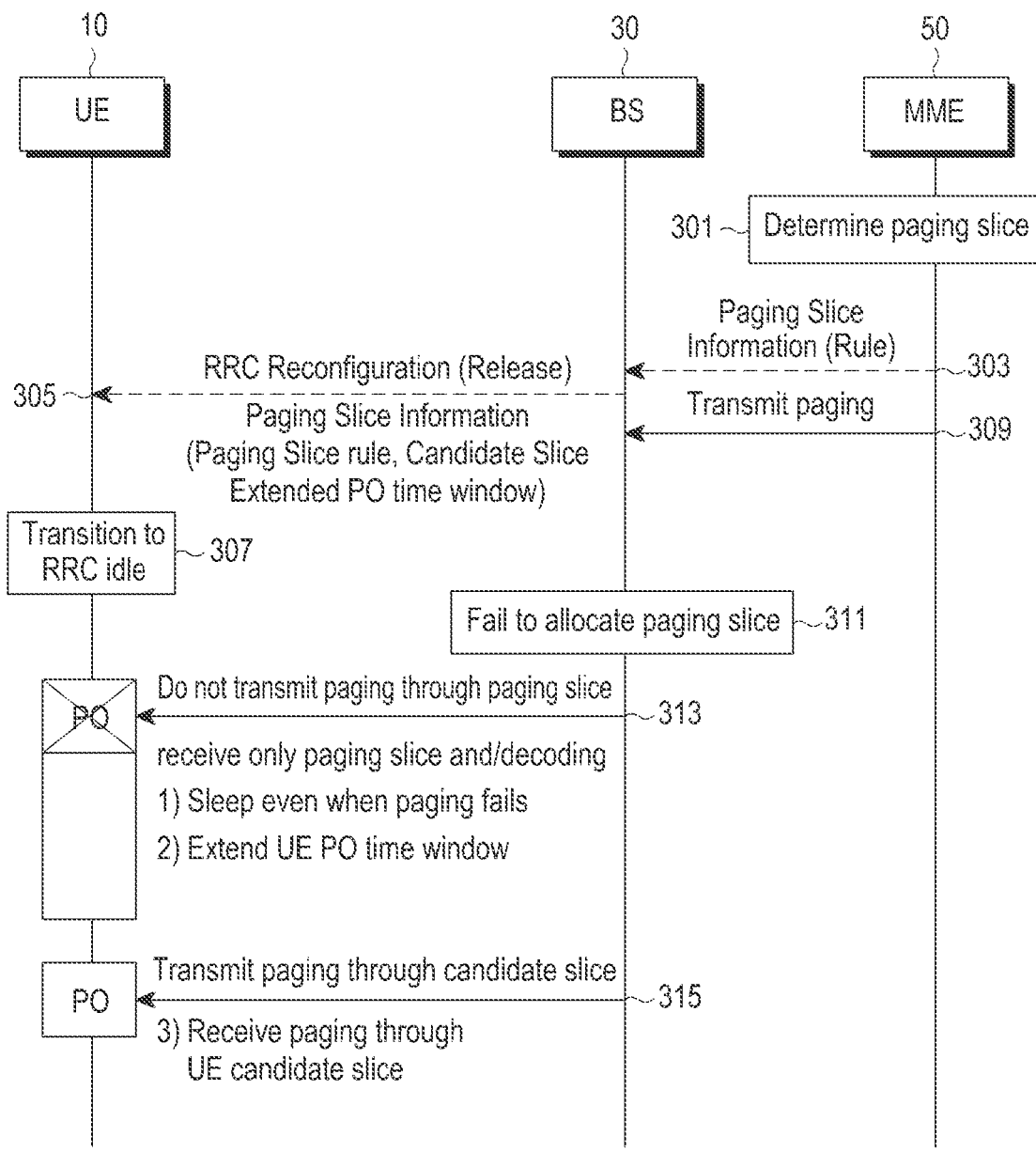
FIG. 3 is a diagram illustrating an example of a deferring/supplementation (deferring) operation when an error occurs in cross-slice paging reception by a UE according to embodiments of the present invention.

FIG. 3 is a diagram illustrating an example of a deferring/supplementary (deferring) operation when an error occurs in cross-slice paging reception by a UE according to an embodiment of the present invention.

In operations 301 and 303, the MME 50 determines a paging slice for the UE 10, and transfers information on the paging slice to the base station 30. In operation 305, the base station 30 transmits the paging slice information to the UE 10 through control signaling for RRC reconfiguration or release. Subsequently, when the UE 10 is switched into an idle state in operation 307, and paging transmitted in operation 309 fails to allocate a paging slice in operation 311, paging is not transmitted in the determined paging slice in operation 313. Examples of options of a possible deferring/supplementary (deferring) operation may include at least one of 1) to 3) of FIG. 3. When paging is transmitted through a candidate slice, the UE may receive paging transmitted through a candidate slice in operation 315.

<Step 3: Transition from RRC_Idle State to RRC_Connected State (RACH)>

Figure 4:
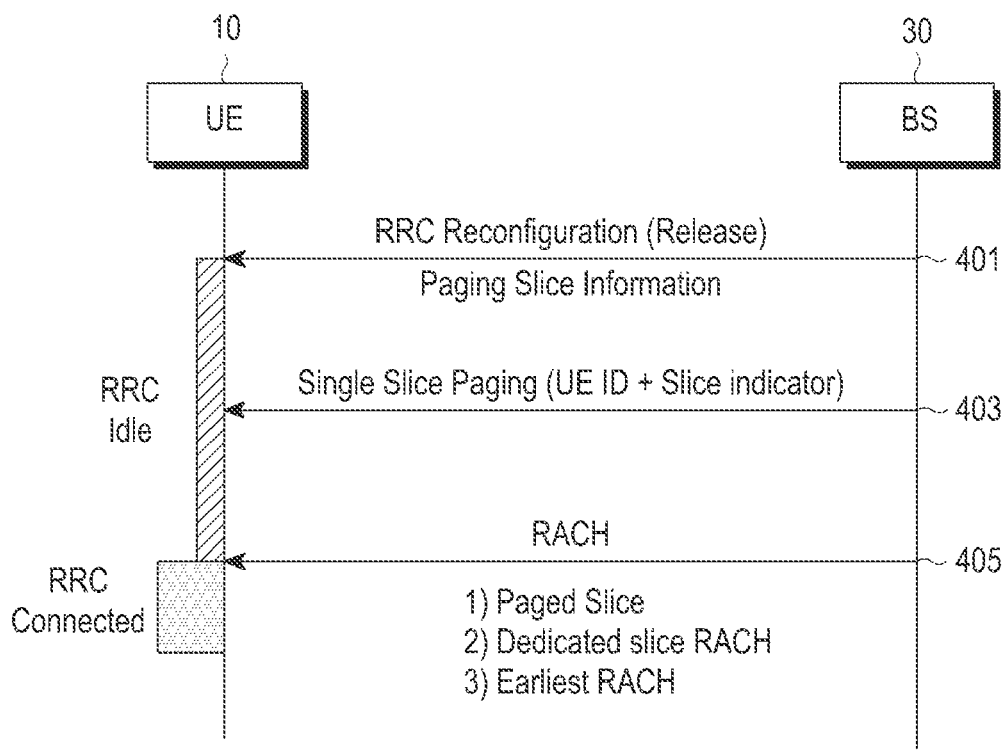
FIG. 4 is a diagram illustrating an example of an operation of transitioning an RRC idle state into an RRC_connected state by performing RACH when paging arrives at a UE, and an example of RACH resources according to embodiments of the present invention.

Referring again to FIG. 2, in operation 207, the UE performs transition from an RRC_idle state to an RRC_connected state through RACH when paging arrives at the corresponding UE after the UE receives paging as illustrated in operations 401 to 405 of FIG. 4. According to the present embodiment, in the three-step operation for transition from the RRC_idle state to the RRC_connected state after the reception of paging, when it is determined that traffic has arrived at the corresponding UE, there are options for RACH operation (common slice RACH, slice dedicated RACH, cross slice RACH (performing RACH using a paging slice or performing RACH using an early slice)), which have been described, and thus, detailed description thereof will be omitted.

In the case of cross slice RACH (performing RACH using an early slice), the earliest RACH resource is utilized and delay of the transition from the RRC_idle state to the RRC_connected state is decreased, whereby delay QoS improvement is expected.

Figure 5:
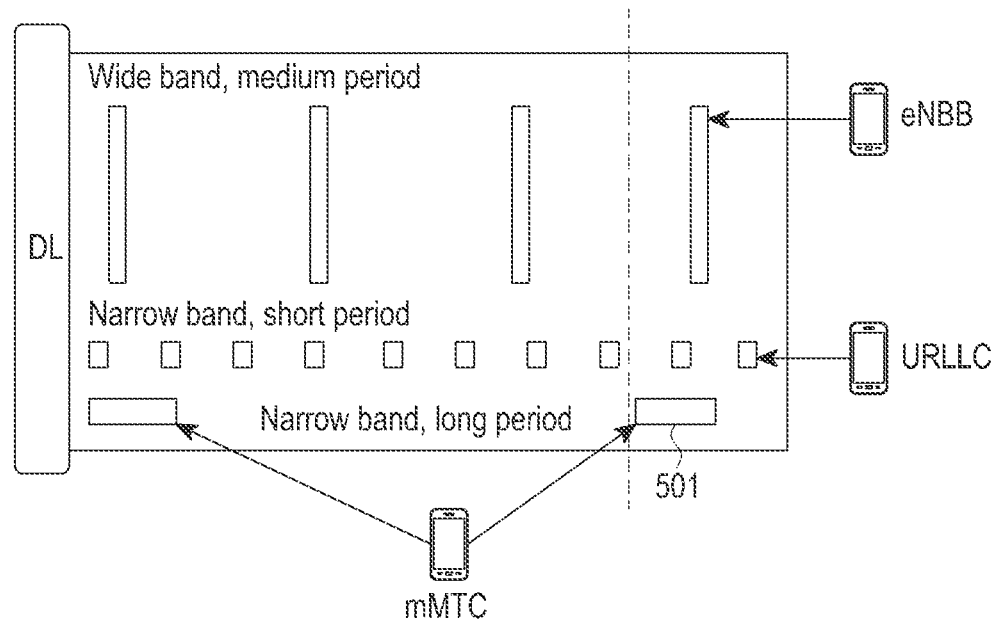
FIG. 5 is a diagram illustrating an effect of an earliest RACH (cross-slice RACH) in a wireless communication system that supports a plurality of services according to embodiments of the present invention.

FIG. 5 is a diagram illustrating the effect of an earliest RACH (cross-slice RACH) in a wireless communication system that supports a plurality of services according to an embodiment of the present invention. Referring to FIG. 5, a UE performs promotion to an RRC_connected state using an RACH resource allocated earlier, such as the diagram 501, irrespectively of a slice.

Figure 6:
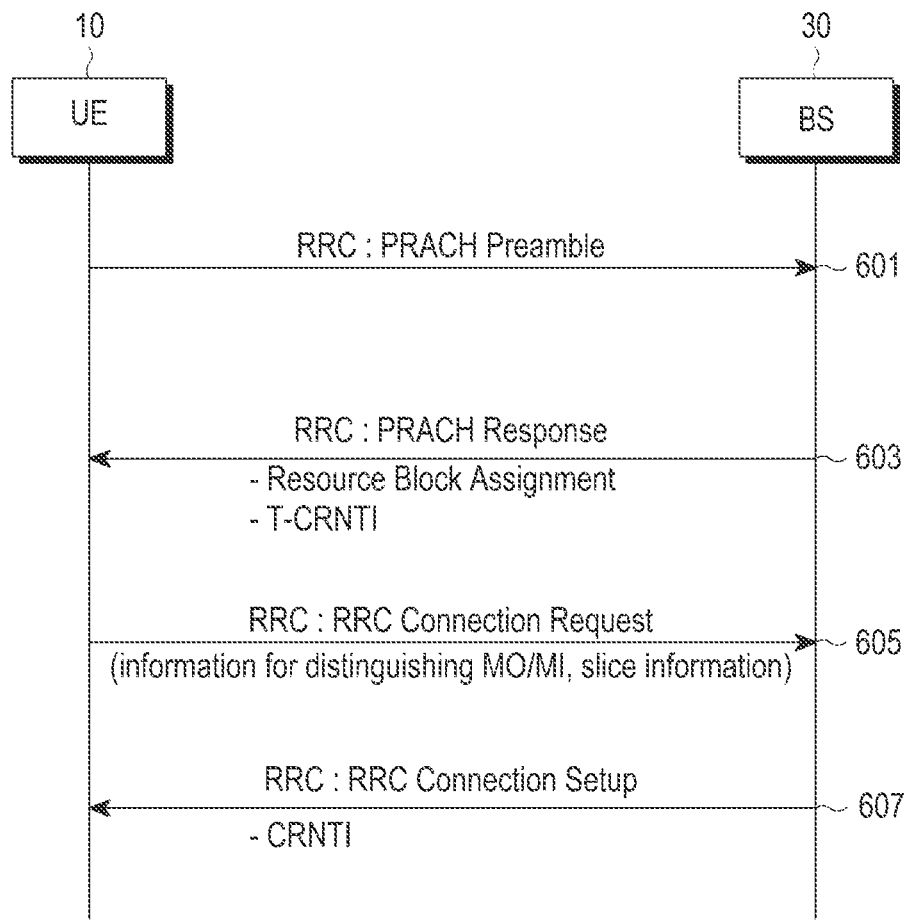
FIG. 6 is a diagram illustrating an earliest RACH procedure in a wireless communication system that supports a plurality of services according to embodiments of the present invention.

FIG. 6 is a diagram illustrating an earliest RACH procedure in a wireless communication system that supports a plurality of services according to an embodiment of the present invention.

Referring to FIG. 6, a UE transmits a PRACH preamble to a base station in operation 601 of the earliest RACH procedure. The base station allocates, to the UE, a resource for transmission of Message 3 in response to the PRACH preamble in operation 603. The UE requests connection based on Message 3 using the allocated resource in operation 605. The base station performs RRC connection setup in response to the connection request in operation 607.

When cross-slice RACH operation is performed according to the earliest RACH procedure of FIG. 6, in the RRC configuration transitioned from the RRC_idle state to the RRC_connected state, the UE needs to inform the base station of service information of corresponding traffic. To this end, the present embodiment proposes a method of adding, as new fields, information for distinguishing whether the corresponding RACH is MO/MT, and slice information of downlink data that arrives at a connection request corresponding to Message 3 in the existing RACH procedure, and immediately performing RRC (re)configuration with respect to the corresponding service even when cross-slice RACH is performed, whereby data transmission delay may be avoided when a connected-state operation is performed.

<Step 4: Activation/Deactivation for Each Service in RRC_Connected State>

Referring again to FIG. 2, in operation 207, the UE transitions to RRC_connected state, and activates a slice resource of the UE. Examples of options for activating a slice resource have been described above. In this instance, activation or deactivation may be performed for each slice.

Table 5 shows an example of options for a tagging operation for other slice arrival information after activating only a paging slice when the UE operates in a connected state in the embodiments of the present invention.

TABLE 5

| Option | Slice Activation | Cross-slice scheduling |
|---|---|---|
| 1 | All Slice Activation | Not needed |
| 2 | Paging Slice activation only | Needed (if Paging slice ≠ Data slice) |
| 3 | Data arrival slice activation only | Not needed (but activation need if DL traffic arrives in other slices) |

In the present embodiment, when the UE operates in a connected state, a cross-slice scheduling method according to slice activation is as follows.

The UE receives scheduling information through an activated slice. That is, the UE successively receives PDCCHs through the activated slice or performs a C-DRX operation.

The UE may not perform reception through other slices. This method is based on a common/dedicated PDCCH design issue.

Also, the UE performs activation when downlink (DL) traffic arrives at a deactivated slice, and the options thereof are, for example, option 1) to option 3) provided below.

Option 1) RRC Reconfiguration (~100 s ms)
Option 2) New MAC CE (~10 s ms)
Option 3) PDCCH DCI new Field (~1 s ms)

Figure 7:
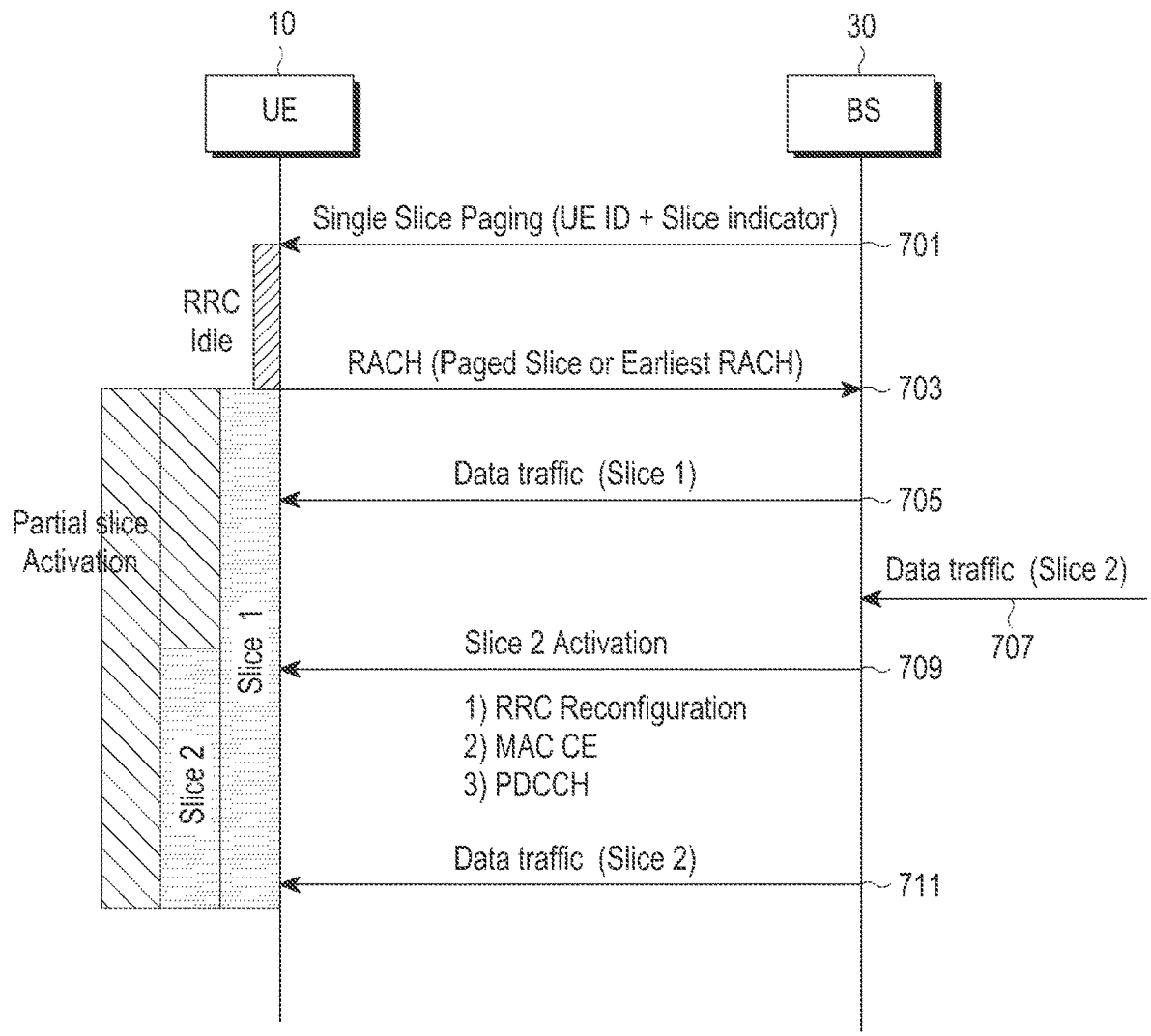
FIG. 7 is a diagram illustrating an example of a signaling procedure for activating a deactivated slice when DL traffic arrives at the deactivated slice according to embodiments of the present invention.

FIG. 7 is a diagram illustrating an example of a signaling procedure for activating a deactivated slice when DL traffic arrives at the deactivated slice according to embodiments of the present invention. FIG. 7 illustrates a procedure in which the UE of FIG. 7 activates a deactivated slice when DL traffic arrives at the deactivated slice, after the UE activates a partial slice when the UE operates in a connected state.

Referring to FIG. 7, the UE receives paging in operation 701, and performs an RACH procedure in operation 703. Subsequently, in operation 705, the UE receives data traffic corresponding to slice 1 (in this instance, it is assumed that slice 2 is in a deactivated state). When DL traffic arrives at the slice 2 in operation 707, the UE activates the slice 2 using at least one of the options 1 to 3 in operation 709. Subsequently, in operation 711, the UE receives DL traffic in the activated slice 2.

Hereinafter, an embodiment of the present invention for setting a new PF and a new PO for receiving paging for each service (slice) in a wireless communication system of the present invention that supports a plurality of services will be described. In a normal 3GPP-based communication system, the PF is a frame allocated to a UE for receiving paging, and the PO is a subframe interval allocated to the UE for receiving paging from among a plurality of subframes included in the PF. The UE may receive paging in a subframe that satisfies the PF and PO. An equation for calculating the PF and PO may refer to the related 3GPP standard.

The embodiments of the present invention propose a method of setting a new PF and PO for receiving paging for each service (slice).

To this end, the present embodiment proposes two methods of setting a paging period for each service, first.

Method 1: separately operating a paging period Tc for each service (in consideration of QoS delay). A conventional system operates one cell specific paging period (in the case of Tc transmission, SIB2: RadioResourceConfigCommon-SIB), the present embodiment operates a paging period Tc for each service, that is, operates multiple paging periods (Tc1, Tc2, Tc3, . . . etc). In this instance, the nB related standard used for a Tc and PF/PO equation and a paging period transmitted through SIB may be changed according to the method 1. Here, "nB" denotes a parameter for controlling the frequency of a PF and a PO within a paging cycle. The related standard is defined as N=Number of paging frames per paging cycle=min(T, nB), Ns=number of paging subframes in a radio frame used for paging=max (1, nB/T).

Method 2: operating a paging period Tc for each service using a multiple (e.g., an integer multiple), and minimizing a Tx/Rx duration. It is assumed that a paging period for each service is Tc1, Tc2, and Tc3, wherein a PF/PO may be freely set in consideration of QoS. In this instance, the paging period for each service may be operated using a multiple, such as Tc2=X Tc1 and Tc3=Y Tc1, and DTX may be maximized.

Figure 8:
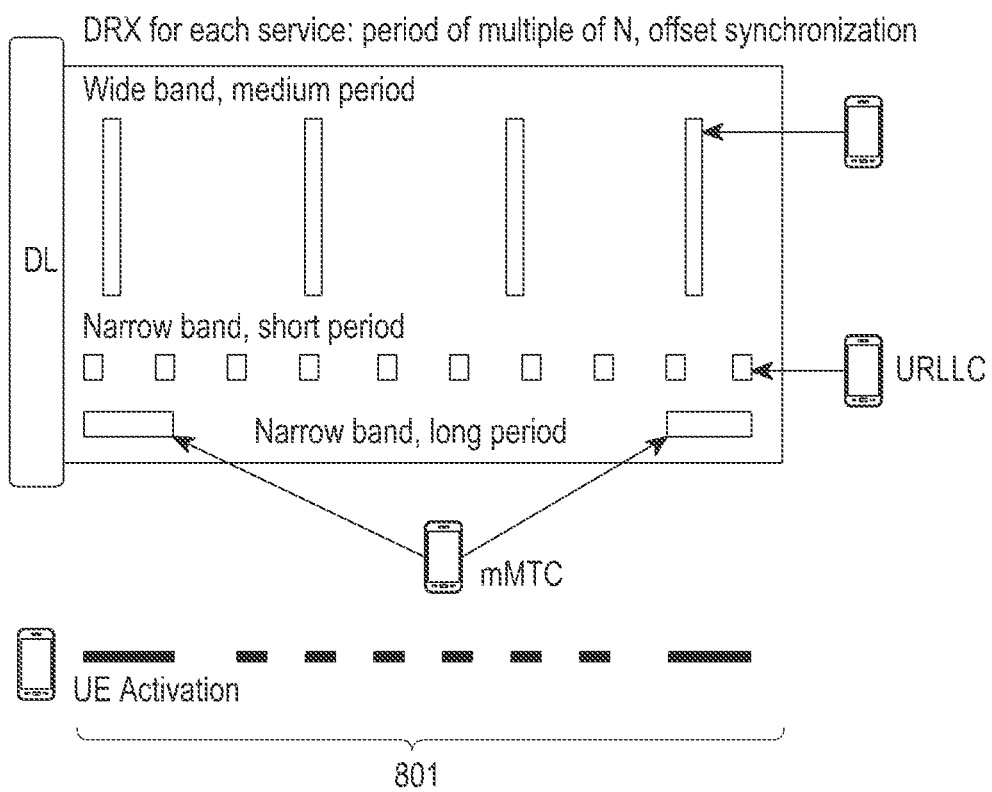
FIG. 8 is a diagram illustrating an example of a method of operating a paging period for each service in a wireless communication system that supports a plurality of services according to embodiments of the present invention.

FIG. 8 is a diagram illustrating an example of a method of operating a paging period for each service in a wireless communication system that supports a plurality of services according to embodiments of the present invention. Referring to FIG. 8, a paging period for each service is set to be different as shown in the diagram 801, which is an example of operating a paging period using a multiple.

According to the present embodiment, in association with a paging transmission operation of a base station, a base station activation (transmission) time may be minimized by synchronizing a PF/PO of paging for each service. In association with a UE paging reception operation, a UE reception (activation) time may be minimized by synchronizing a PF/PO of paging for each service.

Also, the present embodiment proposes a method of controlling a DRX offset for setting a PF and a PO for each service.

Figure 9:
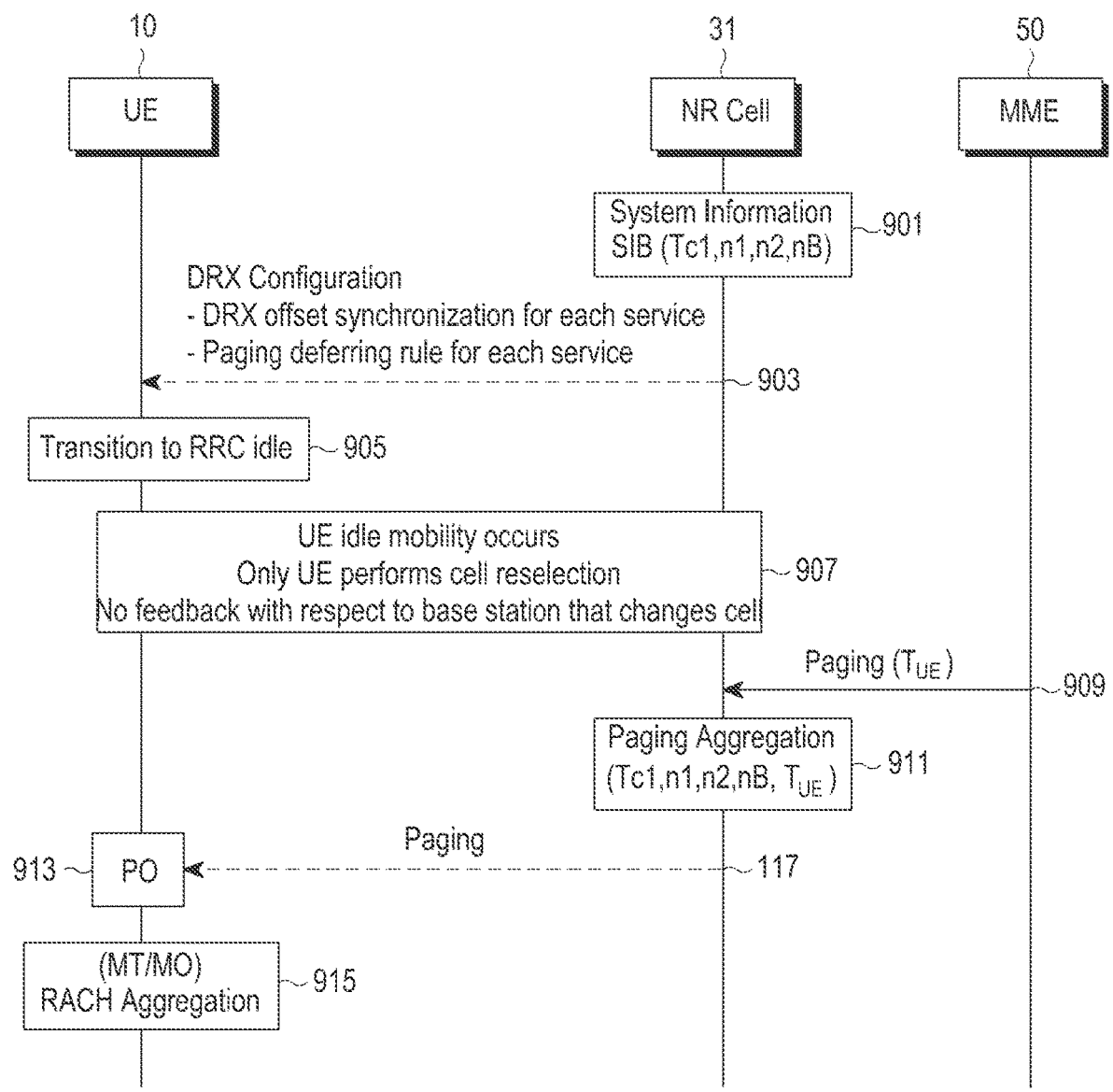
FIG. 9 is a diagram illustrating an example of a method of controlling a DRX offset for each service for setting a PF/PO according to embodiments of the present invention.

FIG. 9 is a diagram illustrating an example of a method of controlling a DRX offset for each service for setting a PF/PO in a wireless communication system that supports a plurality of services according to embodiments of the present invention.

Referring to FIG. 9, in operations 901 and 903, a base station (e.g., an NR cell) 31 sets a paging period for each service, and transmits, to the UE 10, DRX configuration information including information on a paging deferring/supplementary (deferring) rule and DRX offset synchronization for each service. The UE 10 is switched into an idle state in operation 905, and UE idle mobility occurs in operation 907. Subsequently, paging for each service is aggregated through DRX offset synchronization in operations 909 and 911, and the UE performs an RACH procedure by receiving the aggregated paging. In the method of FIG. 9, the MME 50 sets a DRX for each service, and the UE and a base station may minimize an activation period in the idle state of the UE. DRX offset synchronization is performed in a downlink, and DRX offset synchronization for each service in the UE is performed. DRX offset synchronization among a plurality of UEs is performed. Also, RACH deferring transmission exists in an uplink, and RACH aggregation for each service in the UE is performed.

Also, the embodiments of the present invention propose a method of transmitting a paging period and a PF/PO setting rule through SIB2. In the present embodiment, a paging period for each service is set to be different, and a PF/PO group is set.

Figure 10A:
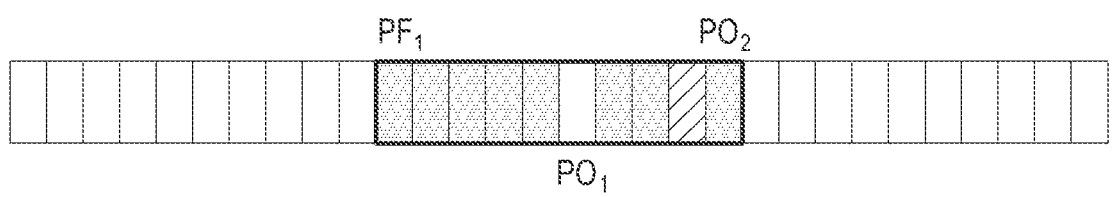
FIGS. 10A and 10B are diagrams illustrating an example of setting a PF/PO group according to embodiments of the present invention.
Figure 10B:
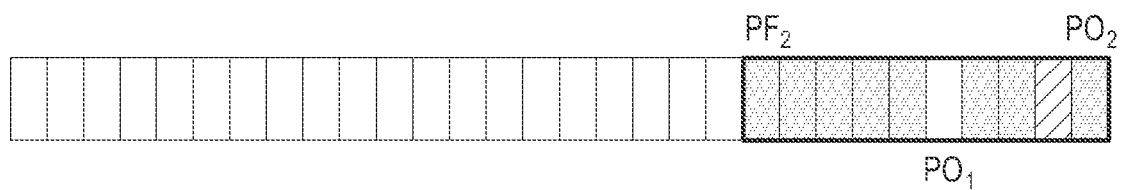

For example, the same paging rule is applied for each service. In this instance, UEs that use the same service have the same paging period and thus, are selected as the same PF/PO group and power efficiency may be improved as shown in FIGS. 10A and 10B. Also, the present embodiment transmits a paging period and a PF/PO setting rule (e.g., nB parameter) through the SIB2. In the case in which the paging period and the PF/PO group, which are set through SIB2, are set, when the UEs that use the same service are the same PF/PO group, the power efficiency may be improved.

Figure 11:
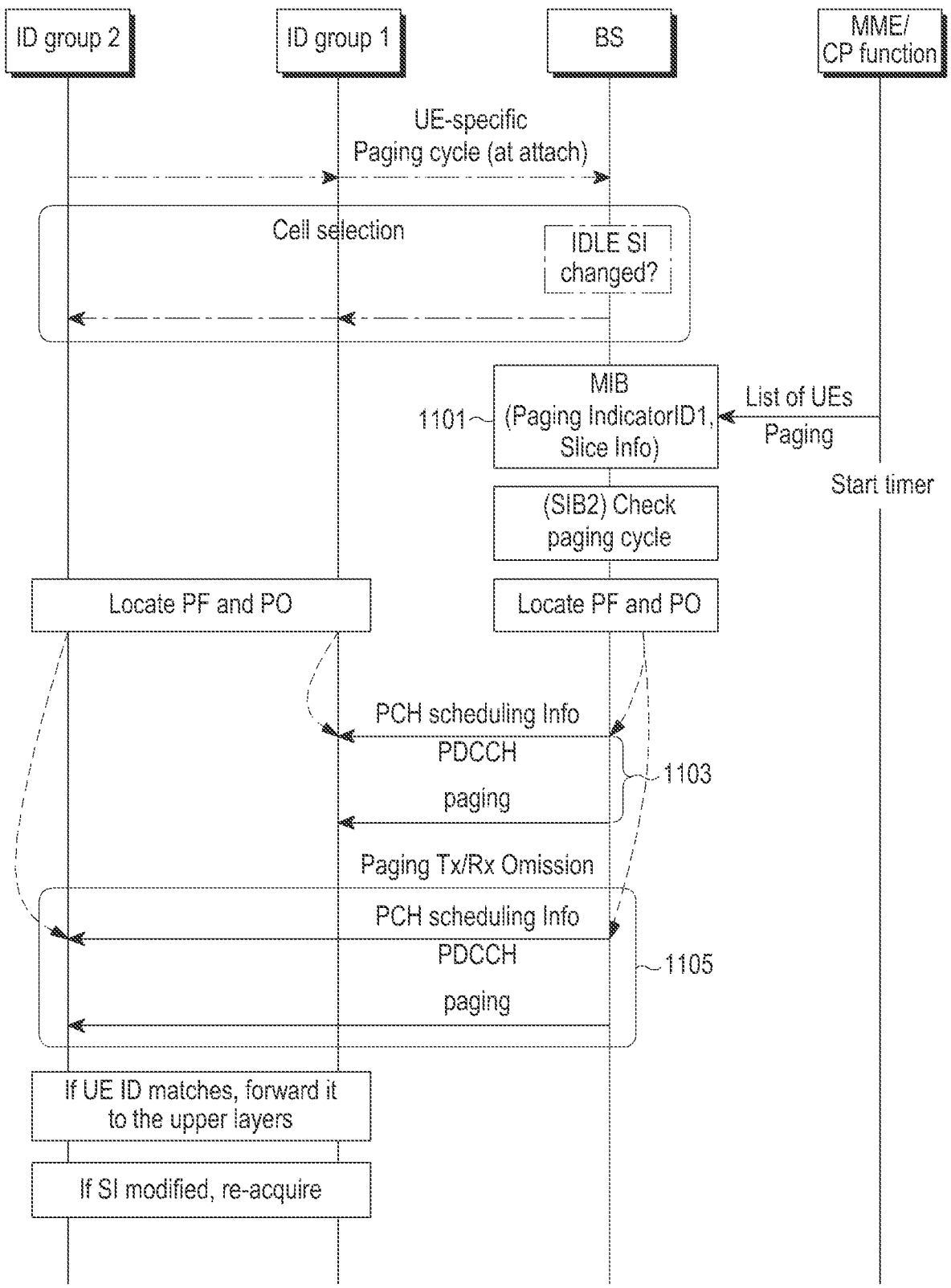
FIG. 11 is a diagram illustrating a method of setting a PF/PO group which uses a paging indicator according to embodiments of the present invention.

Also, the embodiments of the present invention propose a method of providing paging period (PF/PO) information through a page indicator, without using SIB2 (i.e., omitting an operation of receiving an SI-based SIB2 including the page indicator). The base station may group UEs that receive paging of the same service, and operates them as the same paging indicator group in the diagram 1101 of FIG. 11. The base station transmits paging to each PF/PO group corresponding to different paging indicators in operations 1103 and 1105, and does not transmit paging to other PF/PO groups. The UE receives a PF/PO group corresponding to a paging indicator, and remaining UEs operate in a sleep state, whereby UE power reduction may be expected.

Figure 12:
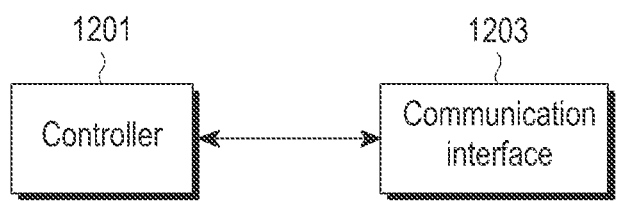
FIG. 12 is a diagram illustrating the configuration of an apparatus according to embodiments of the present invention.

FIG. 12 is a diagram illustrating the configuration of an apparatus according to embodiments of the present invention. The apparatus of FIG. 12 may be applied to the UE 10, the base station 30, and the MME 50.

The configuration of the apparatus of FIG. 12 includes a controller 1201 and a communication interface 1203. The controller 1201 controls signaling related to operations of the apparatus such that paging is transmitted and received through a paging slice according to the method described in FIGS. 1 to 11, and controls an operation for setting a new PF and PO for receiving paging for each service. The communication interface 1203 is for data communication with another network entity, and may be implemented as at least one communication interface for wired/wireless communication such as a transmitter, a receiver, a transceiver, or the like.

As an example, the base station according to embodiments of the present invention may be implemented to include the communication interface 1203 for communicating with another network entity, and the controller 1201 for controlling transmitting, to a UE, information on a paging slice corresponding to a service in which paging is transmitted, and transmitting the paging to the UE through the paging slice. As an example, a UE according to embodiments of the present invention may be implemented to include the communication interface 1203 for communicating with another network entity, and a controller for controlling receiving, from a base station, information on a paging slice corresponding to a service in which transmits paging is transmitted, and receiving the paging through the paging slice.

The invention claimed is:

1. A method performed by a base station in a wireless communication system, the method comprising:
transmitting a master information block (MIB) including information associated with a subcarrier spacing to be used for paging among a plurality of subcarrier spacing, the information associated with the subcarrier spacing indicating a specific frequency size for a symbol; and
transmitting a paging message to a terminal based on the information associated with the subcarrier spacing,
wherein the plurality of the subcarrier spacing in a frequency domain corresponds to a plurality of services to be provided to the terminal.

2. The method of claim 1, further comprising:
transmitting system information including first information associated with a first frame structure,
wherein a specific frame structure corresponds to a specific subcarrier spacing.

3. The method of claim 2, wherein the system information further includes second information on a paging configuration.

4. The method of claim 1, further comprising:
transmitting, to the terminal, downlink control information (DCI) including information on a second frame structure to be activated from a plurality of frame structures supported by the terminal; and
communicating with the terminal based on the second frame structure.

5. A base station in a wireless communication system, the base station comprising:
a transceiver; and
at least one processor configured to control the transceiver to:
transmit a master information block (MIB) including information associated with a subcarrier spacing to be used for paging among a plurality of subcarrier spacing, the information associated with the subcarrier spacing indicating a specific frequency size for a symbol, and
transmit a paging message to a terminal based on the information associated with the subcarrier spacing,
wherein the plurality of the subcarrier spacing in a frequency domain corresponds to a plurality of services to be provided to the terminal.

6. The base station of claim 5,
wherein the at least one processor is further configured to control the transceiver to transmit system information including first information associated with a first frame structure, and
wherein a specific frame structure corresponds to a specific subcarrier spacing.

7. The base station of claim 6, wherein the system information further includes second information on a paging configuration.

8. The base station of claim 5, wherein the at least one processor is further configured to:
control the transceiver to transmit, to the terminal, downlink control information (DCI) including information on a second frame structure to be activated from a plurality of frame structures supported by the terminal, and
communicate with the terminal based on the second frame structure.

9. A method performed by a terminal in a wireless communication system, the method comprising:
receiving a master information block (MIB) including information associated with a subcarrier spacing to be used for paging among a plurality of subcarrier spacing, the information associated with the subcarrier spacing indicating a specific frequency size for a symbol; and
receiving a paging message, from a base station, based on the information associated with the subcarrier spacing,
wherein the plurality of the subcarrier spacing in a frequency domain corresponds to a plurality of services to be provided to the terminal.

10. The method of claim 9, further comprising:
receiving system information including first information associated with a first frame structure,
wherein a specific frame structure corresponds to a specific subcarrier spacing.

11. The method of claim 10, wherein the system information further includes second information on a paging configuration.

12. The method of claim 9, further comprising:
receiving, from the base station, downlink control information (DCI) including information on a second frame structure to be activated from a plurality of frame structures supported by the terminal; and
communicating with the base station based on the second frame structure.

13. A terminal in a wireless communication system, the terminal comprising:
a transceiver; and
at least one processor configured to control the transceiver to:
receive a master information block (MIB) including information associated with a subcarrier spacing to be used for paging among a plurality of subcarrier spacing, the information associated with the subcarrier spacing indicating a specific frequency size for a symbol, and
receive a paging message, from a base station, based on the information associated with the subcarrier spacing,
wherein the plurality of the subcarrier spacing in a frequency domain corresponds to a plurality of services to be provided to the terminal.

14. The terminal of claim 13,
wherein the at least one processor is further configured to control the transceiver to receive system information including first information associated with a first frame structure, and
wherein a specific frame structure corresponds to a specific subcarrier spacing.

15. The terminal of claim 14, wherein the system information further includes second information on a paging configuration.

16. The terminal of claim 13, wherein the at least one processor is further configured to:
control the transceiver to receive, from the base station, downlink control information (DCI) including information on a second frame structure to be activated from a plurality of frame structures supported by the terminal, and
communicate with the base station based on the second frame structure.

\* \* \* \* \*